United States Patent [19]

Stauber

[11] Patent Number: 4,678,426

[45] Date of Patent: Jul. 7, 1987

[54] TRANSFER NOZZLE IN A HOT RUNNER TOOL

[76] Inventor: Bernard Stauber, Hirschenplatz 146, CH-8460 Marthalen, Switzerland

[21] Appl. No.: 786,958

[22] PCT Filed: Feb. 1, 1985

[86] PCT No.: PCT/CH85/00015

§ 371 Date: Sep. 30, 1985

§ 102(e) Date: Sep. 30, 1985

[87] PCT Pub. No.: WO85/03476

PCT Pub. Date: Aug. 15, 1985

[30] Foreign Application Priority Data

Feb. 6, 1984 [CH] Switzerland .................... 558/84

[51] Int. Cl.$^4$ .................... B29C 45/20; B29C 33/02
[52] U.S. Cl. .................... 425/549; 425/552; 425/DIG. 227; 425/DIG. 245
[58] Field of Search ..... 425/547, 549, 552, DIG. 227, 425/DIG. 245

[56] References Cited

U.S. PATENT DOCUMENTS

| | | | |
|---|---|---|---|
| 2,367,144 | 1/1945 | Shaver | 425/547 X |
| 2,436,869 | 3/1948 | Lester | 425/547 X |
| 2,475,395 | 7/1949 | Lester | 425/547 X |
| 2,750,628 | 6/1956 | Renier | 425/547 X |
| 2,773,284 | 12/1956 | Kelly | 425/DIG. 227 |
| 3,335,459 | 8/1967 | Tyrner | 425/547 X |
| 3,537,139 | 11/1970 | Segmuller | 425/549 |
| 4,161,386 | 7/1979 | Osuna-Diaz | 425/547 X |
| 4,230,934 | 10/1980 | ter Beek et al. | 425/547 X |
| 4,373,132 | 2/1983 | Vartanian | 425/549 X |
| 4,517,453 | 5/1985 | Tsutsumi | 425/549 X |

FOREIGN PATENT DOCUMENTS

| | | | |
|---|---|---|---|
| 665 | 1/1971 | Japan | 425/547 |
| 771025 | 3/1957 | United Kingdom | 425/547 |

*Primary Examiner*—Robert Spitzer
*Attorney, Agent, or Firm*—McGlew and Tuttle

[57] ABSTRACT

This transfer nozzle consists of a nozzle body with a disk type cylindrical center part (21) and two axial nozzle cones (22,23). On a part of their height the nozzle cones (22, 23) are embraced by a sleeve-like collar (25, 26) and within the collars there are several axial passage openings (27, 28). A radial passage opening (30) through the center part (21) serves to receive a heating cartridge. The nozzle body (21, 22, 23) is supported by means of the outermost portions of the two collars (25, 26) on the one hand in the supporting basket (2) and on the other hand in the tool part (5), so that little heat can be lost to the cooled machine parts. The nozzle cavity (11) forms an air cushion around the center part (21) which also has a heat-insulating effect. Such a transfer nozzle has a low structural height and can keep the molding material warm from within, and by the axial arrangement of two nozzle cones the material is ejected with each molding.

9 Claims, 1 Drawing Figure

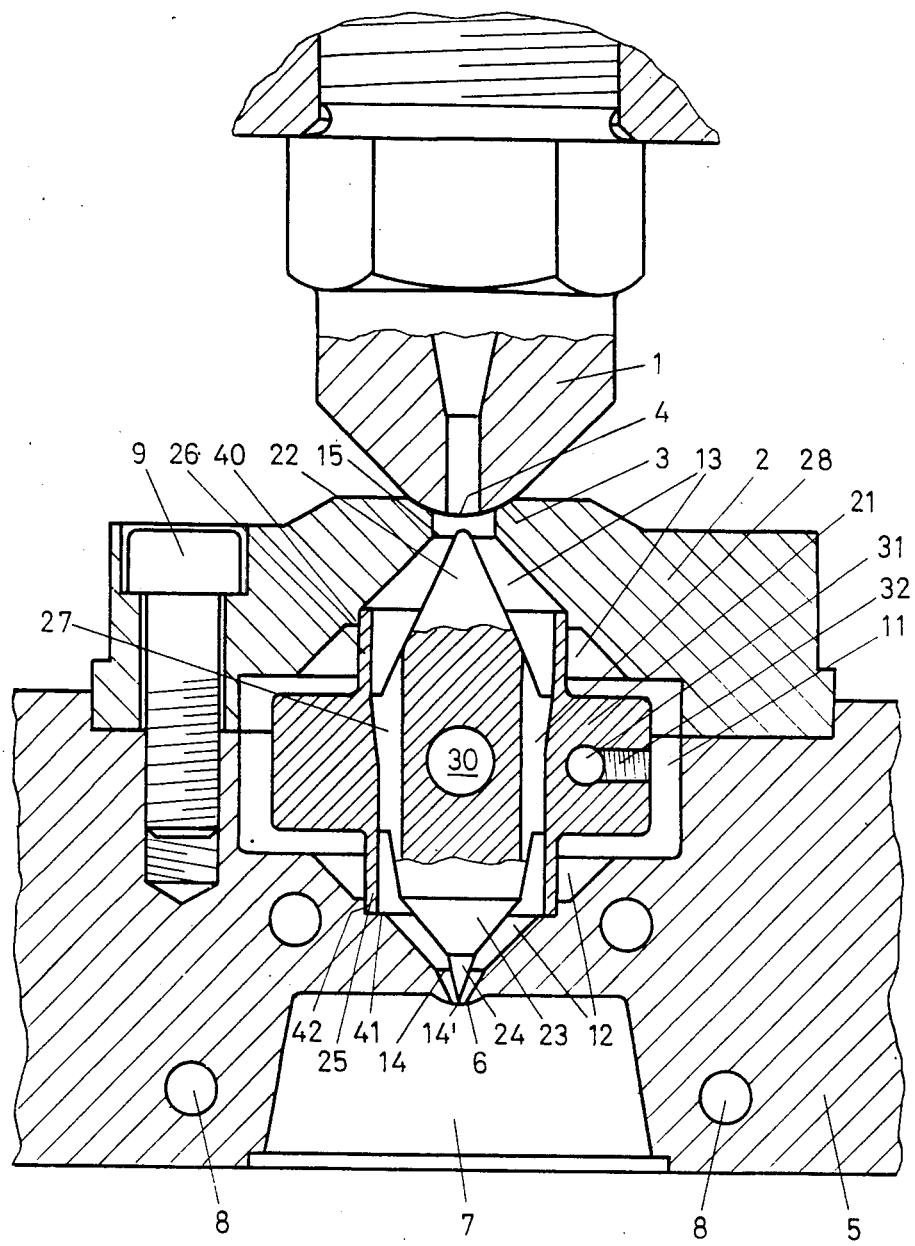

TRANSFER NOZZLE IN A HOT RUNNER TOOL

The present invention relates to a transfer nozzle or die in a hot runner tool according to the preamble of the independent patent claim 1 or hot channel injector of a hot channel plastic injection molding machine, in which the nozzle mouth opens directly into the mold cavity and is provided with a heatable nozzle body having a conical tip situated in the nozzle mouth, which nozzle body is disposed in a nozzle cavity or transfer chamber of the hot channel injector located between the supporting body or basket forming a connection to the machine supply nozzle and that tool part or main tool body containing the injection nozzle which opens directly into the mold cavity of the machine. In hot runner tools or hot channel injectors for plastic injection molding machines the nozzle mouth opens directly into the mold cavity. Thereby sprue parts are avoided, which would have to be removed after the injection molding plastic material has solidified. A disadvantage is that in a cooled tool part or main tool body a runner or channel must be maintained at the melting temperature of the plastic. Several design forms for transfer nozzles, which are arranged between the machine nozzle and the mold cavity, have become known from the practice.

According to a known older design form described in Swiss Patent CH-A No. 578,417, the nozzle mouth of the injection nozzle is formed by a cap. The nozzle body is located in a central bore and comprises a positively controlled nozzle needle which closes the nozzle mouth in closing position. The nozzle body comprises an axial through-bore for passage of the material being molded.

By the Plastic Service GmbH in Mannheim, hot runner nozzles in various design forms have been illustrated in a data sheet collection for a product group 4.3 Hot Runner System "Thermojet". In it a nozzle insert is provided with an axial eccentric runner for liquid molding material. In the central zone of the nozzle head is a so-called torpedo tip in the form of a cone free on all sides, whose tip is arranged in the nozzle mouth. In the center of the torpedo, an axially disposed cylindrical heating cartridge is provided. The nozzle body is further provided with an external accessory heater band. To keep the heat removal as low as possible, air pockets are formed in the holding region of the tool part, in that the nozzle body is mounted exactly centered by means of ribs. The feed lines must be brought out laterally through the axial centered arrangement of the heating cartridge, and this requires the eccentric arrangement of the runner and a relatively large nozzle cavity in the region of the torpedo tip, to utilize the heat given off on all sides. At these points, however, a high temperature may result, and molding material present there may "boil away". Besides, after work interruptions relatively much unusable molding material must be liquefied in this nozzle cavity, which constitutes a loss of energy.

It is, therefore, an object of the invention to avoid these disadvantages in a hot runner injection nozzle. According to the invention, this objective is achieved by the features of providing a nozzle body consisting of a cylindrical heatable center part and a nozzle tip axially contiguous thereto and a sprue cone, with a tip and cone being provided with sleeve-like collars which embrace or surround the nozzle tip and the sprue cone at least when a part of their length, and which is supported on the one hand at the supporting basket or body and on the other hand at the tool part or main tool body; and of providing within the sleevelike collars a number of axial passages for the plastic which passages are distributed in annular arrangement; and in particular of providing in the center part of the nozzle body a radial passage bore for the uptake or accommodation of a heating element therein. Especially advantageous design forms contemplate forming a heat insulating interspace between walls of the nozzle cavity and the outer edge portions of the nozzle body in addition to the sleevelike collars which support the nozzle body at the supporting basket or body and at the tool part or main tool body; axially guiding one collar of the nozzle in the supporting basket or body and resting the other collar by way of its front edge on an annular shoulder in the tool part or main tool body; and providing the collar which engages the supporting basket or body with a greater diameter than that of the collar which engages the tool part or main tool body.

In the following, an embodiment is explained with reference to the drawing, in which is shown a sectional view of a transfer nozzle between a machine nozzle and a tool part.

The machine nozzle 1 is represented partially in section and only schematically, as these nozzles are known to every specialist. The hemispherical nozzle portion 4 is inserted in a matching depression 3 in a supporting body or basket 2. The machine nozzle 1 is, of course, pressed against the supporting basket 2 in known manner with hydraulically operated pressure elements.

By means of several bolts 9 with Allen screw head, the tool part or main tool body 5, traversed by several cooling channels 8 and provided with a mold cavity 7, is rigidly fastened to the supporting basket 2. The nozzle mouth 6 of the hot channel injector transfer nozzle opens directly into the mold cavity 7.

A nozzle cavity or transfer chamber is formed partly in the supporting basket 2 and partly in the tool part 5 and appears as a central cylindrical part 11 with truncated cones 12, 13 axially contiguous thereto and tapering outwardly for thereby forming an internal wall defining the transfer chamber. The top surfaces 14, 14', 15 of these truncated cones 12, 13 form, on the one hand, the opening to the machine nozzle 1 and, on the other, the nozzle mouth 6 of the transfer nozzle. As indicated in the drawing, the transitions may be offset or formed cylindrically, to form an advantageous gate geometry.

The forms of these transition points are themselves well known among specialists, and they are determining for the break-off height at the molded part.

Inserted in this nozzle cavity 11, 12, 13 is a similarly formed nozzle body, which is composed of a disk-like cylindrical central part 21 and axially aligned nozzle cones 22, 23 on both sides. Here, too, the tool-side cone tip is formed in the same manner as the truncated cone 14, 14' of the nozzle cavity, that is, a cone tip 24 placed on a truncated cone 23.

Both nozzle cones 22, 23 are embraced or surrounded, up to a certain height, by a sleeve type collar 25, 26, and within these collars 25, 26 there are four passage openings 27, 28 distributed over a circle line, i.e. annularly. The disk-like central part 21 is provided with a radial blind bore 31 itself-provided with radial access bore 43. The radial passage bore 30 serves to receive a heating cartridge, and in the blind bore 31 a heat sensor can be inserted.

For the retention of the nozzle body in the nozzle cavity, the wall of the truncated cone 13 in the supporting basket 2 is provided with a cylindrical guide 40, and the truncated cone 12 in the tool part 5 is provided with a radial annular shoulder 41 and axial guide 42. Thus the nozzle body is supported in the tool part 5 by the one sleeve type collar 25 and centrally guided by the opposite sleeve type collar 26. If an axial heat expansion occurs, the exact position of the nozzle body in the nozzle cavity can therefore not change.

As is clearly indicated, the sleeve type collar 26 has a larger diameter than the opposite collar 25. It can thereby be achieved that the material emerging from the machine nozzle 1 presses the nozzle body against the shoulder 41.

By this arrangement as described and illustrated in the drawing an optimum heat balance is obtained. The nozzle body 21, 22, 23 is heated from within and can form a uniform heated body within the liquid molding material. Since only the outermost portions or free portions of the collars 25, 26 apply against the cooled portions of tool part 5 and supporting basket 2, this heat gradient is not transmitted up to the nozzle cones 22, 23. These collars 25, 26 seal off the heat insulation space 11 all around the central part 21 and no molding material can get into this space. The rest of the molding material-filled dead space of the truncated cones remains heated by the nozzle cones 22, 23 and the material is continuously replaced by newly inflowing material. Hence no material remains in a transfer nozzle thus designed. Another advantage of such an arrangement is the small mounting length, which due to the radial arrangement of the heating cartridge is substantially shorter than for an axial inserted heating cartridge.

It would be conceivable to prolong the transfer nozzle, in order to mold therewith a mold for a hood from the inner side or respectively from the core side. There could be provided several nozzle cones arranged radially around a median plane of the disk type center part 21, in order to sprue several modes from a laterally admitted runner. The entire nozzle body might consist of a good heat conductor or there might be inserted at least cores of such a material up to the nozzle cone tips. Also a different number of passage openings than four of them, as shown, might be provided; instead of the heating cartridge there might then be used a heater band or a coil cartridge.

It would be possible also to insert the nozzle in multiple tools; the material supply would in that case occur, not directly via the cylinder nozzle 1, but via a conventional hot runner distributor or manifold.

In the above embodiment a nozzle body with only one nozzle tip has been explained. Naturally the form of the nozzle body can be varied, if circumstances so require, it may comprise two or more cone tips arranged side by side.

I claim:

1. Hot channel injector arrangement of a hot channel plastic injection molding machine having a machine supply nozzle and a mold cavity, comprising A hot channel injector having an internnal wall defining an axial transfer chamber provided with a receiving end and a delivery end in axially opposed relation, a receiving entrance at the receiving end for receiving plastic from a supply nozzle of the machine and a delivery exit at the delivery end provided with a nozzle mouth opening directly into a mold cavity of the machine for delivering hot plastic thereto, and An axial nozzle body in the chamber and having a heatable intermediate disc portion provided with a receiving side and a delivery side in axially opposed relation and containing a heating element accommodating intermediate radial passage bore therein, an axial sprue cone on the receiving side, an axial nozzle conical tip on the delivery side, an axial cone sleeve collar on the receiving side and having an outer free end, said cone collar being outwardly spaced from and surounding the cone along at least a part of the axial extent of the cone, an axial tip sleeve collar on the delivery side and having an outer free end, said tip collar being outwardly spaced from and surrounding the tip along at least a portion of the axial extent of the tip, and a plurality of axial flow passages for injected plastic annularly distributed in the disc portion for communicating the space between said cone collar and cone on the receiving side with the space between said tip collar and tip on the delivery side, The nozzle body being arranged in spaced relation to the internal wall defining the chamber with the cone adjacent yet spaced from the chamber entrance and the tip adjacent the mouth of the chamber exit, and being mounted in the chamber by positioning engagement of said cone collar free end and said tip collar free and with corresponding adjacent portions of the internal wall defining the chamber.

2. Arrangement of claim 1 wherein the free ends of said collars are in sealing engagement with the corresponding adjacent portions of the internal wall defining the chamber for forming a heat insulating intervening dead space axially between said collars and radially between the internal wall of the chamber and the disc portion and said collars of the nozzle body.

3. Arrangement of claim 2 wherein the portion of the internal wall adjacent said cone collar is provided with axial guide means for axially guiding said cone collar free and thereat, and the portion of the internal wall adjacent said tip collar is provided with should abutment means for abuttingly supporting said tip collar free and thereagainst.

4. Arrangement of claim 3 wherein said cone collar has a larger diameter than said tip colloar.

5. Arrangement of claim 1 wherein the injector includes a supporting body containing the receiving entrance and a main injector body containing the delivery exit, said supporting body and main body together therein the internal wall defining the transfer chamber, and means for interconnecting said supporting body and said main body, the nozzle body being mounted in the chamber with said cone collar in engagement with the adjacent portion of the internal wall formed by said supporting body and with said tip collar in engagement with the adjacent portion of the internal wall formed by said main body.

6. arrangement of claim 3 wherein said cone collar free end is in sealing engagement with the adjacent portion of the internal wall defined by said supporting body and said tip collar free end is in sealing engagement with the adjacent portion of the internal wall defined by said main body for forming a heat insulating annular dead space axially between said collars and radially between said supporting body and main body of the injector and the disc portion and said collars of the nozzle body.

7. Arrangement of claim 6 wherein the portion of the internal wall defined by said support body adjacent said cone collar is provided with axial guide means for axially guiding said cone collar free and thereat, and the portion of the internal wall defined by said main body adjacent said tip collar is provided with shoulder abutment means for abuttingly supporting said tip collar free and thereagainst to prevent relative axial and radial displacement therebetween.

8. Arrangement of claim 7 wherein said cone collar has a larger diameter than said tip collar.

9. Arrangement of claim 1 wherein said cone collar has a larger diameter than said tip collar.

* * * * *